(12) United States Patent
Cho (10) Patent No.: US 9,008,845 B2
(45) Date of Patent: Apr. 14, 2015

(54) NETWORK SYSTEM AND CONTROL METHOD THEREOF

(75) Inventor: Sunguk Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 13/338,442

(22) Filed: Dec. 28, 2011

(65) Prior Publication Data

US 2012/0191254 A1 Jul. 26, 2012

(30) Foreign Application Priority Data

Jan. 24, 2011 (KR) ........................ 10-2011-0006939

(51) Int. Cl.
| | |
|---|---|
| G05B 11/01 | (2006.01) |
| G05B 15/00 | (2006.01) |
| G05B 21/00 | (2006.01) |
| G05B 13/00 | (2006.01) |
| G01M 1/38 | (2006.01) |
| G05D 23/00 | (2006.01) |
| F24F 11/00 | (2006.01) |
| H04L 12/28 | (2006.01) |

(52) U.S. Cl.
CPC ........... *F24F 11/0086* (2013.01); *F24F 11/006* (2013.01); *H04L 12/2818* (2013.01); *H04L 12/2825* (2013.01); *F24F 2011/0047* (2013.01); *F24F 2011/0064* (2013.01); *F24F 2011/0068* (2013.01); *F24F 2011/0071* (2013.01); *F24F 2011/0075* (2013.01)

(58) Field of Classification Search
USPC ............................................. 700/17, 83, 276
See application file for complete search history.

(56) References Cited

U.S. PATENT DOCUMENTS

| | | | | |
|---|---|---|---|---|
| 6,631,619 | B2* | 10/2003 | Nonaka et al. | 62/126 |
| 6,778,945 | B2* | 8/2004 | Chassin et al. | 702/188 |
| 7,027,808 | B2* | 4/2006 | Wesby | 455/419 |
| 7,092,794 | B1* | 8/2006 | Hill et al. | 700/276 |
| 7,197,579 | B2* | 3/2007 | Saito et al. | 710/15 |
| 7,904,209 | B2* | 3/2011 | Podgorny et al. | 700/276 |
| 8,635,320 | B2* | 1/2014 | Ishizaka | 709/223 |
| 8,689,572 | B2* | 4/2014 | Evans et al. | 62/126 |
| 2007/0137233 | A1* | 6/2007 | Hatano et al. | 62/230 |
| 2011/0004350 | A1* | 1/2011 | Cheifetz et al. | 700/276 |
| 2011/0209487 | A1* | 9/2011 | Tachiki et al. | 62/129 |
| 2012/0221150 | A1* | 8/2012 | Arensmeier | 700/276 |

FOREIGN PATENT DOCUMENTS

WO WO2009022453 * 2/2009 .............. F24F 11/02

OTHER PUBLICATIONS

Google translated version of WO/2009/022453; 26 pages; printed from Internet on Sep. 9, 2014.*

* cited by examiner

*Primary Examiner* — Ronald Hartman, Jr.
(74) *Attorney, Agent, or Firm* — KED & Associates LLP (57) ABSTRACT

A network system is provided. The network system includes an air conditioner, a terminal, a power supply source, and a power management apparatus. The air conditioner includes a first communication module so as to enable communication. The terminal includes a second communication module which is communication-connected to the first communication module, and downloads predetermined information from a web server. The power supply source supplies power to the air conditioner. The power management apparatus manages power information supplied from the power supply source. On the basis of at least one of the power information and information on an operation of the air conditioner, the terminal displays power use information of the air conditioner.

8 Claims, 11 Drawing Sheets

NETWORK SYSTEM AND CONTROL METHOD THEREOF

CROSS-REFERENCE TO RELATED APPLICATION(S)

The present application claims priority under 35 U.S.C. 119 and 35 U.S.C. 365 to Korean Patent Application No. 10-2011-0006939 filed on Jan. 24, 2011, which is hereby incorporated by reference in its entirety.

BACKGROUND

1. Field

The present disclosure relates to a network system and a control method thereof.

2. Background

Air conditioners are electric home appliances that maintain indoor air at the optimal condition according to use and purposes. For example, in summer, air conditioners maintain an indoor space at an air-conditioned state. In winter, air conditioners maintain an indoor space at a heated state, adjust indoor humidity, and maintain an indoor space at a cleaned state.

As the use of life convenience products such as air conditioners increases progressively, consumers require products that have the high efficiency of used energy, enhanced performance, and the convenience of use.

Air conditioners are categorized into split type air conditioners that include a split indoor unit and outdoor unit, and integrated air conditioners that include an indoor unit and outdoor unit combined into one device, according to whether an indoor unit and an outdoor unit are split from each other.

Furthermore, air conditioners are categorized into wall-mounted air conditioners, frame type air conditioners mounted on wall, and slim type air conditioners that stand in a living room, according to the installed types of air conditioners.

Moreover, air conditioners are categorized into single type air conditioners that have a capacity enabling only the driving of one indoor unit and are used in a narrow place such as home, medium-large size air conditioners that have a very large capacity enabling the use thereof in companies or restaurants, and multi air conditioners that have a capacity enabling the sufficient driving of a plurality of indoor units, according to capacities of indoor units.

In air conditioners of the related art, when intending to control the operation of an air conditioner or change the operating condition of the air conditioner, there is inconvenience in that a user approaches the air conditioner (for example, an indoor unit) and directly manipulates an input button.

To solve these limitations, a remote controller for remotely controlling an air conditioner has been developed. However, the remote controller is merely a mechanical device that simply transmits a certain signal to the air conditioner. Furthermore, since the remote controller and the air conditioner are restricted in communication distance (i.e., distance enabling the transmission and reception of a signal), there is a limitation in that communication is not performed between the remote controller and the air conditioner well.

Moreover, it is difficult for the remote controller to include all the elements and functions of an input unit for controlling various functions of the air conditioner, and consequently, there is a limitation in that the remote controller remotely controls only frequently-used functions among the various functions.

When a user is using an air conditioner, it is limited for the user to check how much power has been used for a certain duration and how much electricity cost is imposed for an amount of used power. Therefore, it is difficult to perform the planned use of an air conditioner for saving electricity cost.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. However, the spirit and scope of the present disclosure are not limited to the disclosed embodiments, and those skilled in the art can easily propose other embodiments within the same spirit and scope.

Figure 1:
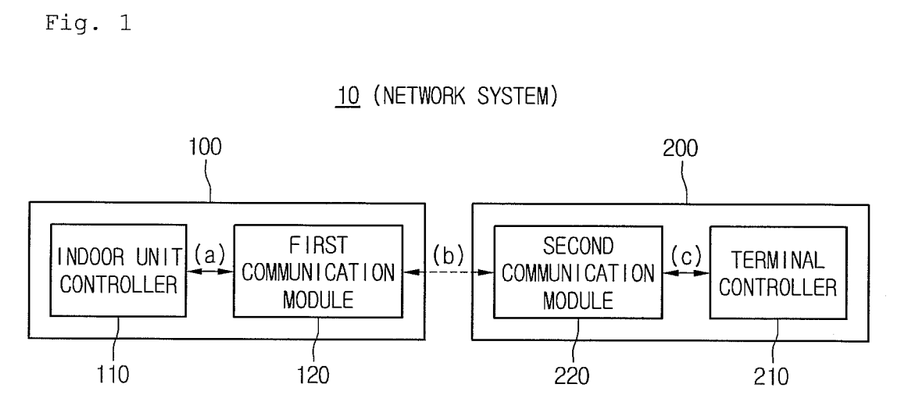
FIG. 1 is a block diagram schematically illustrating a configuration of a network system according to a first embodiment.

FIG. 1 is a block diagram schematically illustrating a configuration of a network system according to a first embodiment.

Referring to FIG. 1, a network system 10 according to an embodiment includes an air conditioner that is provided for conditioning indoor air, and a terminal 200 that is provided so as to enable communication with the air conditioner 100.

The terminal 200 may be a mobile terminal that is portable and usable by a user. The user may transmit/receive specific information with the terminal 200. As an example, the user may perform voice call or video call with another user by using the terminal 200, and the terminal 200 may transmit/receive specific data to/from another terminal.

The air conditioner 100 includes an indoor unit controller 110 for controlling an indoor unit disposed in an indoor space, and a first communication module 120 that is connected to the indoor unit controller 110 and provided as a means for communicating with the terminal 200.

When the air conditioner 100 is a split type air conditioner, the first communication module 120 may be described as being connected to the indoor unit controller 110. When the air conditioner 100 is an integrated air conditioner, the first communication module 120 may be understood as being connected to a controller of an air conditioner or a controller of an indoor unit. That is, the first communication module 120 may be described as being connected to one controller for controlling an operation of an air conditioner.

The indoor unit controller 110 and first communication module 120 may be connected by a serial communication system (a). As an example, the serial communication system may include a Universal Asynchronous Receiver/Transmitter (UART) system. The UART system may include an interface Integrated Chip (IC) (for example, a line driver/receiver) that receives a transmitted signal, changes the received signal to a signal robust to noise, and extends a transmission distance of the signal. As the interface IC, there are RS232, RS422, and RS485. The serial communication system (a) may be called a first communication interface that is regulated inside the air conditioner 100, namely, between the indoor unit controller 110 and the first communication module 120 and interfaces information.

The terminal 200 includes a terminal controller 210 for controlling an operation of the terminal 200, and a second communication module 220 that is connected to the terminal controller 210 and provided as a means for wirelessly communicating with the air conditioner 100.

The terminal controller 210 and second communication module 220 may be connected by a serial communication system (c). The serial communication system (c) may be the same serial communication system (a). The serial communication system (c) may be called a second communication interface that is regulated inside the terminal 200, namely, between the terminal controller 210 and the second communication module 220 and interfaces information.

The first and second communication modules 120 and 220 may be connected so as to enable wireless communication. The first and second communication modules 120 and 220 may be gateways that connect the air conditioner 100 and terminal 200. A communication system (b) between the first and second communication modules 120 and 220 may be a wireless communication system, and include Bluetooth, WiFi, Ad-hoc, or Zigbee. The communication system (b) may be called a third communication interface that is regulated between the air conditioner 100 and the terminal 200 and interfaces information.

Figure 2:
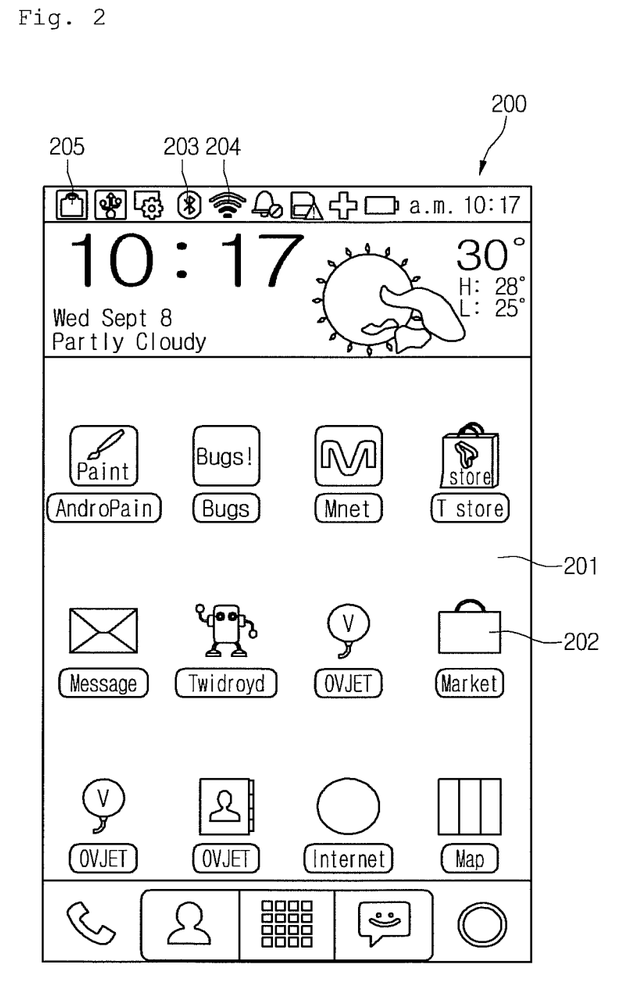
FIGS. 2 to 4 are diagrams illustrating an operation where an application is downloaded to a terminal according to a first embodiment.
Figure 3:
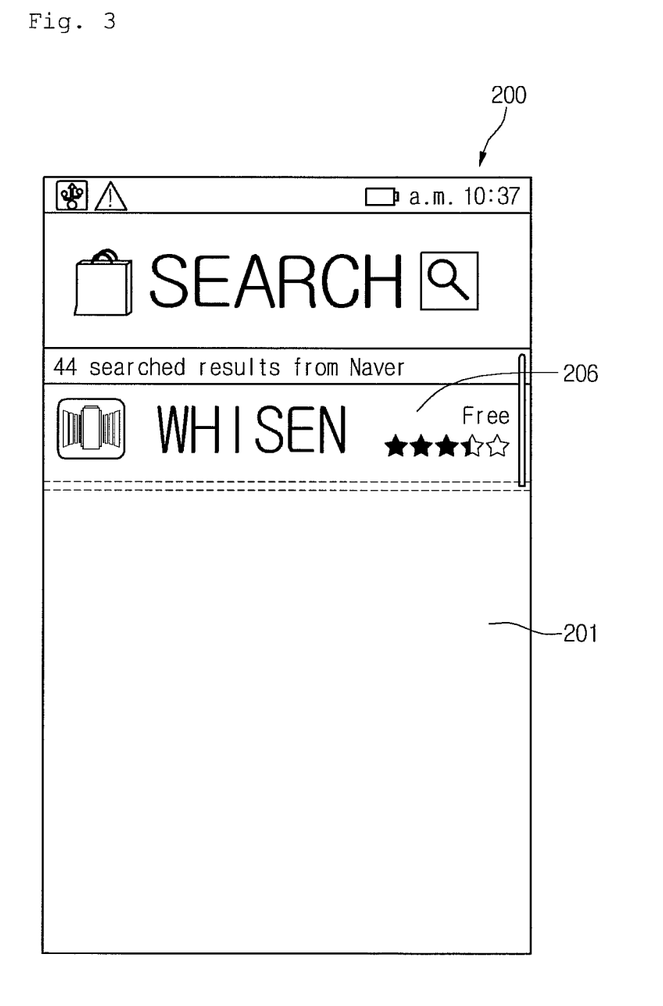
Figure 4:
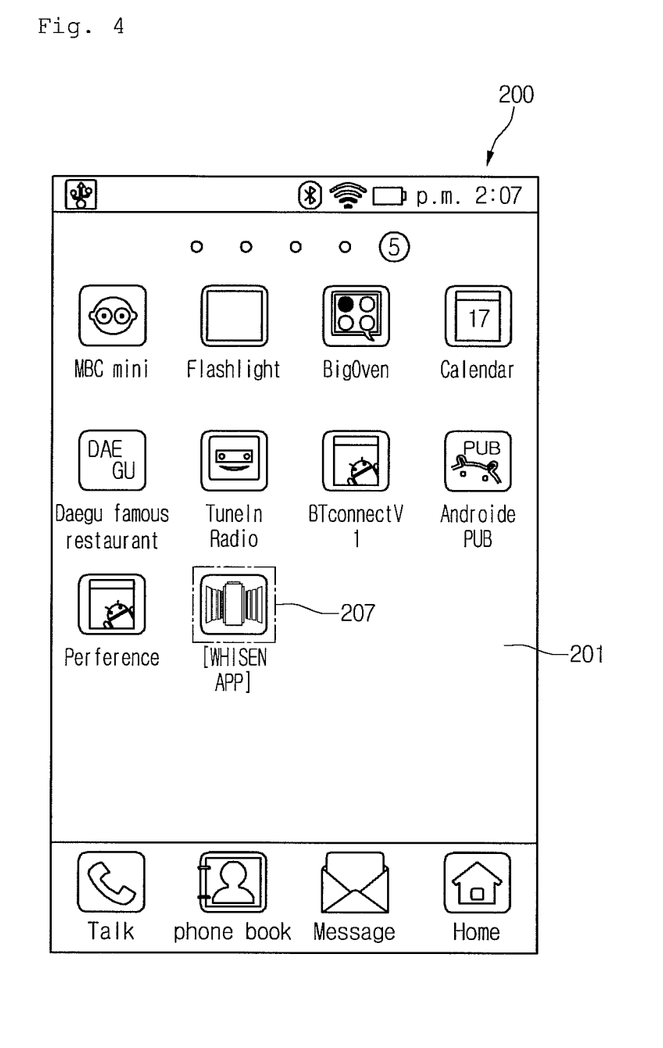

FIGS. 2 to 4 are diagrams illustrating an operation where an application is downloaded to a terminal according to an embodiment.

Referring to FIGS. 2 to 4, the terminal 200 according to an embodiment may access Internet, and download specific information from the outside. The terminal 200 includes a display unit 201 that displays specific content. The display unit 201 displays at least one selection unit that is executable for an operation of the terminal 200.

The selection unit includes a web market selection unit 202 that is connected to a web server to enable the downloading of specific information. When the web market selection unit 202 is executed, the terminal 200 may be connected to Internet and access a specific web server (for example, a web market for downloading a specific program).

A user may input a specific command by touching the display unit 201. That is, the user may execute a plurality of selection units including the web market selection unit 202 with a touch pen, finger or the like.

As illustrated in FIG. 3, the terminal 200 may execute the web market selection unit 202 and then search a control program (for example, an application) of the air conditioner 100. When the terminal 200 has searched a control program name ("WHISEN" in FIG. 3) to be downloaded, the searched result is displayed on a search result display unit 206 of the terminal 200.

When the searched result is selected and executed, the display unit 201 may display contents (for example, a pop-up window) associated with a procedure for downloading the control program, and the user may manipulate the terminal 200 according to the displayed contents to download the control program. When the downloading of the control program is completed, as illustrated in FIG. 4, a display unit (i.e., an icon) indicating a control application 207 is generated and displayed on the display unit 201.

The display unit 201 displays a Bluetooth display unit 203 and WiFi display unit 204 for displaying the connection of a specific wireless communication system. The Bluetooth display unit 203 or WiFi display unit 204 may be activated according to the communication system connected to the terminal 200.

For example, when the terminal 200 is Bluetooth-connected to another device, the Bluetooth display unit 203 may be activated, or when the terminal 200 is WiFi-connected to another device, the WiFi display unit 204 may be activated. Alternatively, the Bluetooth display unit 203 and WiFi display unit 204 may be activated simultaneously.

Moreover, the display unit 201 includes an update display notification unit 205 for displaying that there is specific information (for example, a specific program), stored in the terminal 200, to be updated.

In association with the control application 207, when a function of an application is added or corrected, the update display notification unit 205 may be activated. Furthermore, the user may update the application with the web server (for example, web market).

As an example of an update method, when the web market execution unit 202 is selected, indication that "update is available" may be displayed for an application requiring update among applications stored in the terminal 200. The user may execute a corresponding application, and then add or correct a function of the application according to an update message.

Figure 5:
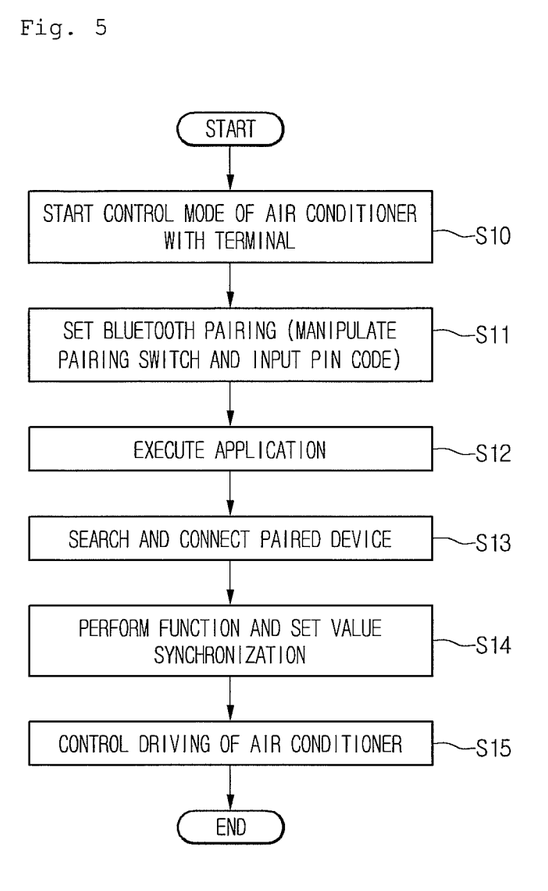
FIG. 5 is a flowchart illustrating a method of connecting communication between a terminal and air conditioner according to a first embodiment.

FIG. 5 is a flowchart illustrating a method of connecting communication between a terminal and air conditioner according to a first embodiment.

Referring to FIG. 5, the terminal 200 according to the first embodiment may be connected to the air conditioner 100, and control the driving of the air conditioner 100. In the embodiment, the terminal 200 may be connected to the air conditioner 200 by a Bluetooth system.

As described above, when a control application has been downloaded to the terminal 200, a control mode of the air conditioner 100 may be started by the terminal 200 in operation S10.

In detail, pairing is set as an initial operation for connecting Bluetooth between the terminal 200 and air conditioner 100. The pairing, as an operation of forming permanent connection between two Bluetooth devices, is an operation that is performed by exchanging a pin code between the two devices, for security. The pairing is executed only once in an initial stage, for Bluetooth connection. Pairing-related information may be recorded in a Bluetooth device list of the terminal 200.

The communication module 120 includes a pairing switch. For Bluetooth pairing, a device searchable mode is entered by manipulating the pairing switch for a certain time. If the pairing switch is not pushed, device search for Bluetooth connection is not performed.

The user inputs the pin code with the terminal 200, and thus, the pairing is completed. However, if the pairing fails, the air conditioner 100 or terminal 200 may display a pairing failure message in operation S11.

The pairing is performed between the air conditioner 100 and terminal 200, and thereafter the terminal 200 executes a control program (i.e., an application) in operation S12.

If the control program is executed, by searching a paired device, Bluetooth automatic connection with an air conditioner to be controlled is attempted. When the number of air conditioners to be controlled is two or more, connection may be attempted in order.

In an operation where Bluetooth connection is attempted between two devices (for example, a terminal and an air conditioner), the display unit 201 of the terminal 200 may display a message indicative of "being connected to an air conditioner". Furthermore, when the Bluetooth connection is completed, the display unit 201 may display a message indicative of "connected to an indoor unit" in operation S13.

In operation S14, when Bluetooth connection is completed between the terminal 200 and air conditioner 100, the terminal 200 may perform a synchronizing operation which uses the function of the air conditioner 100 or a state value that is set in the air conditioner 100. Herein, the synchronizing operation may include a function synchronizing operation or a set value synchronizing operation.

When synchronization for the function or set value of the air conditioner 100 is performed in the terminal 200, the terminal 200 may control the driving of the air conditioner 100 in operation S15.

Hereinafter, a second embodiment will be described. In a configuration for communicating information on power, there is a difference between the first and second embodiments, and thus, the following description will be focused on the difference. In the first and second embodiments, like reference numerals refer to like elements.

Figure 6:
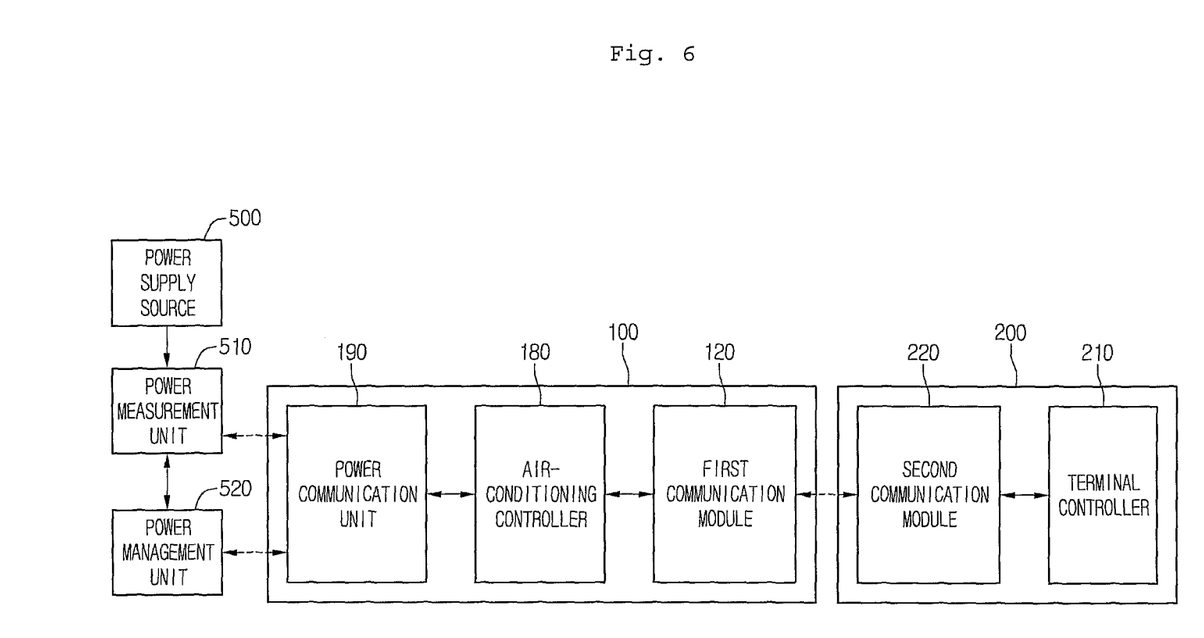
FIG. 6 is a block diagram illustrating a configuration of a network system according to a second embodiment.

FIG. 6 is a block diagram illustrating a configuration of a network system according to a second embodiment.

Referring to FIG. 6, a network system 10 according to the second embodiment includes a power measurement unit 510 that receives information (hereinafter referred to as power information) on power supplied from a power supply source 500, and a power management unit 520 that is connected to the power measurement unit 510 so as to enable communication and controls an operation associated with the power of an air conditioner 100.

The power supply source 500 may include a power marketer, and a power middle supplier that purchases power from the power marketer and supplies the power to homes or companies. The air conditioner 100 may receive power from the power supply source 500 and receive the power information through the power measurement unit 510.

The power information includes supplied power information, electricity cost information, produced power information, and information on power quality (stability). The electricity cost information may be changed with time. As an example, the electricity cost may be changed in real time, or changed according to a predetermined schedule.

The power management unit 520 or an air-conditioning controller 180 may control an operation time or mode (course) of the air conditioner 100 on the basis of the power information.

As an example, when the power information received through the power measurement unit 510 is on-peak time information, the air conditioner 100 is controlled to avoid an on-peak time section or save consumption power. Herein, the on-peak time section may be understood as a time section where power cost is greater than a predetermined reference cost. A time section other than the on-peak time may be understood as a off-peak time section.

A mode of reducing the consumption power includes a mode that limits an operation of at least one component having relatively high power consumption among a plurality of components configuring the air conditioner 100, and a mode that limits a course (operation mode) having a relatively high power consumption. Such a mode may include a low power use mode that has been set in the air conditioner 100, and a user setting mode that is manually set by a user.

The air conditioner 100 includes a power communication unit 190 that transmits/receives power information so as to enable communication with the power measurement unit 510 or power management unit 520, a first communication module 120 that is connected to a terminal 200 so as to enable communication therebetween, and the air-conditioning controller 180 that is connected to the power communication unit 190 and first communication module 120 and controls the air conditioner 100.

The power communication unit 190 may be included in the air conditioner 100 as one module, and provided at an external side of the air conditioner 100 so as to be attachable to or detachable from the air conditioner 100. The power communication unit 190 may have the same configuration as that of the first communication module 120.

A communication system between the power communication unit 190 and the power measurement unit 510 or power management unit 520 may include a wired/wireless communication system. The wired communication system may include a general asynchronous communication system, and the wireless communication system may include Zigbee system, Bluetooth system, or WiFi system.

The power information transferred from the power measurement unit 510 may be transferred to the terminal 200 through the air conditioner 100. While the terminal 200 is connected to the air conditioner 100, a user may check the power information with the terminal 200.

The power information may be pre-stored in an application installed in the terminal 200, and updated at certain intervals. In detail, when the update of the power information is required, the terminal 200 displays update information, and the user executes the application to update the power information to new power information.

On the basis of the power information, when the on-peak time section arrives, this is notified to the user by the terminal 200. The user may control the air conditioner 100 so as to save consumption power with the terminal 200. As an example, by setting the low power use mode or user setting mode, the consumption power of the air conditioner 100 can be reduced.

The power information may be transferred to the terminal 200 over Internet. In detail, the application may have a power information checking function, and monitor the power information transferred from the power supply source 500 to a web server. For example, when specific information on power (i.e., information on the on-peak time section) is supplied from the power supply source 500, the terminal 200 may monitor the specific information.

According to such a configuration, the user may receive the power information with the terminal 200, and control the air conditioner 100 in order to save electricity cost on the basis of the received power information.

The operation mode of the air conditioner 100 may be controlled according to a control command of the terminal 200, and the air conditioner 100 may be controlled to a predetermined mode (scheme) on the basis of the power information transferred from the terminal 200.

Another embodiment is disclosed below.

In FIG. 6, the power measurement unit 510 or power management unit 520 is illustrated as being connected to the power communication unit 190 so as to enable communication therebetween. Unlike this, however, the power measurement unit 510 or power management unit 520 may be connected to a second communication module 220 so as to enable communication therebetween.

In this case, the power information received from the power supply source 500 may be directly transferred to the terminal 200.

To provide a summary on the above described, the terminal 200 may receive information (first information), transferred from the first communication module 120, on the operation of the air conditioner 100, and information (second information) that is transferred from the first communication module 120 through the power measurement unit 510 or power management unit 520.

Furthermore, the terminal 200 may display the first and second information on the display unit 201, at which point the user may check content displayed on the display unit 201 and control the operation of the air conditioner 100. Particularly, information regarding the on-peak time section among the second information may be transferred to the terminal 200, and displayed on the terminal 200. As a result, the user may control the operation time or function of the air conditioner 100, in a mode for reducing electricity cost or consumption power.

Figure 7:
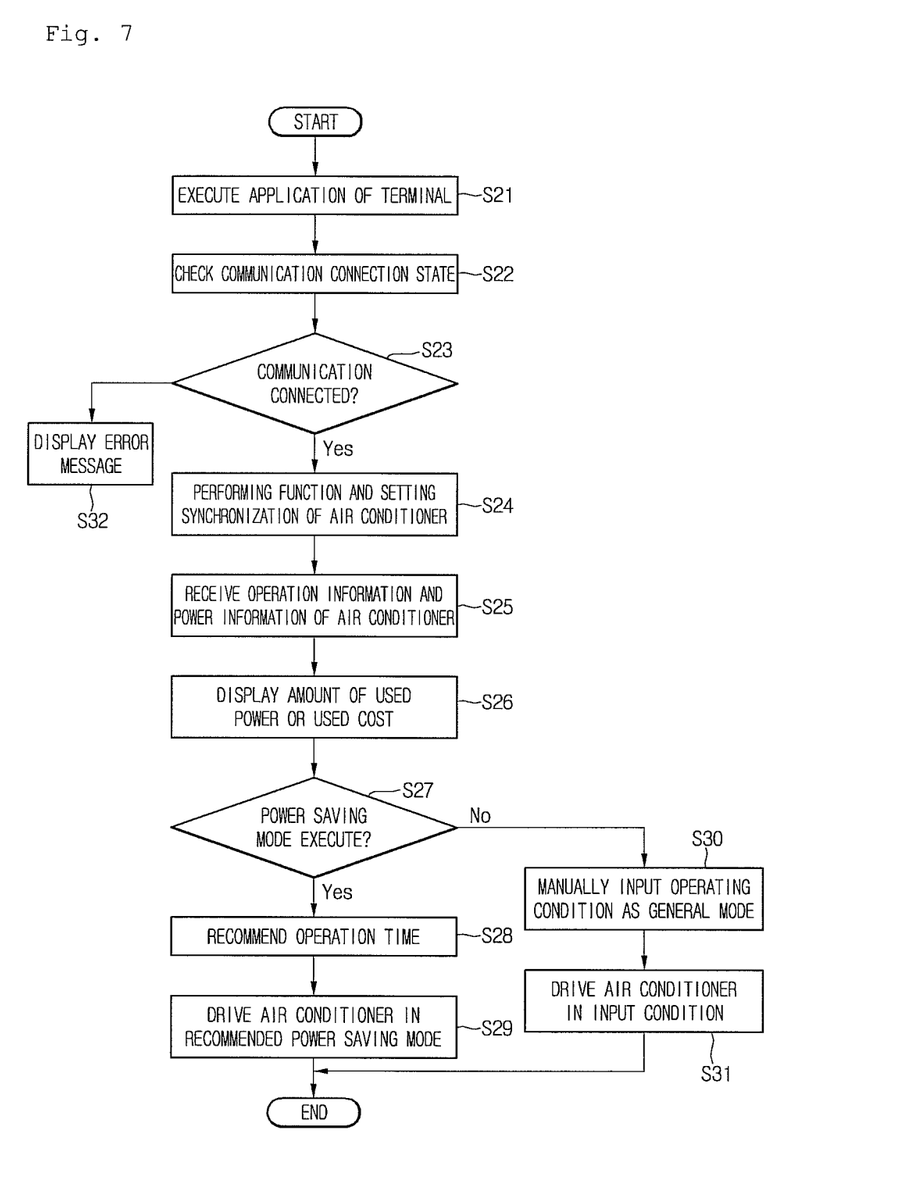
FIG. 7 is a flowchart illustrating a control method of an air conditioner according to a second embodiment.

FIG. 7 is a flowchart illustrating a control method of an air conditioner according to a second embodiment.

Referring to FIG. 7, when an application installed in the terminal 200 is executed, the connection state of a communication system (for example, Bluetooth or WiFi) between the air conditioner 100 and terminal 200 may be checked. Furthermore, the connection state of a communication system between the air conditioner 100 and the power measurement unit 510 or power management unit 520 may be checked. When the air conditioner 100 and the power measurement unit 510 or power management unit 520 is set to enable communication therebetween, the communication connection state between the air conditioner 100 and the power measurement unit 510 or power management unit 520 may be checked in operations S11 and S12.

When communication connection is checked as being made between the air conditioner 100 and terminal 200 and the power measurement unit 510, or power management unit 520, the function or set state value information of the air conditioner 100 is synchronized with the terminal 200 in operations S23 and S24.

Operation information (hereinafter referred to as first information) of the air conditioner 100, for example, information of consumption power that was used for a certain duration in the past and power information (hereinafter referred to as second information) received from the power supply source 500, may be transmitted to the terminal 200.

The consumption power information within the past certain duration may include daily, monthly, quarterly, or yearly consumption power information. While the past consumption power information is stored in the air conditioner 100, the past consumption power information may be transferred when the application is executed. The power information, for example, may include electricity cost information within a duration corresponding to the past consumption power information in operation S25.

The terminal 200 may display the amount or cost of power that is used by the air conditioner 100 for a certain duration. The amount or cost of used power may be calculated and displayed by the terminal 200, and information calculated by the air conditioner 100 may be transferred to and displayed by the terminal 200.

For example, the terminal 200 may display power use information on the air conditioner 100. The power use information may include the used power amount (currently used amount, daily used amount, monthly used amount, quarterly used amount or the like) or power cost of the air conditioner 100 in operation S26.

The application may determine whether to perform a power saving mode for controlling the operation of the air conditioner 100 in operation S27. The power saving mode may include a time recommendation mode for avoiding the on-peak time and recommending the off-peak time section, and a course recommendation mode for recommending a certain course (operation course) that is performed for saving consumption power or electricity cost. Herein, the operation course may include one function of the air conditioner 100, for example, temperature control, air volume control, air-conditioning mode, or power air conditioning (strong air conditioning).

When an input for performing the power saving mode is received with the terminal 200, an operation time or course of the air conditioner 100 may be recommended for reducing consumption power or electricity cost. Furthermore, the user may drive the air conditioner 100 according to the recommended power saving mode in operations S28 and S29.

However, when an input for not performing the power saving mode is received in operation S27, the operation mode of the air conditioner 100 may be determined as a general mode. The user may manually input the operating condition of the air conditioner 100, and the air conditioner 100 may operate on the basis of the input condition in operations S30 and S31.

When communication connection is checked as not being made between the air conditioner 100 and terminal 200 and the power measurement unit 510, or power management unit 520 in operation S23, the terminal 200 may display a message indicating "communication connection failed". Also, the message may be displayed by the air conditioner 100 in operation S32.

Hereinafter, a third embodiment will be described. In a configuration for communicating information on power, there is a difference between the third embodiment and the preceding embodiments, and thus, the following description will be focused on the difference. In the first to third embodiments, like reference numerals refer to like elements.

Figure 8:
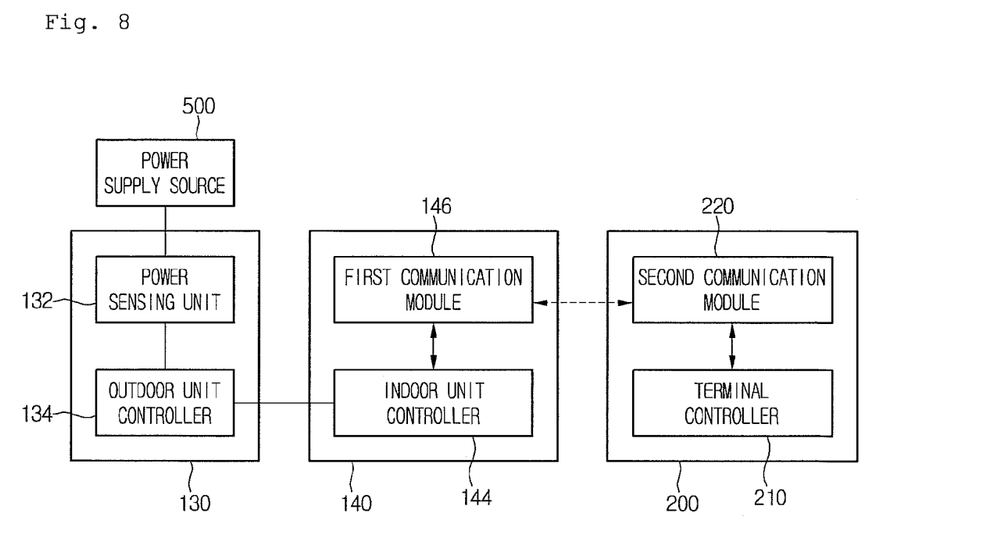
FIG. 8 is a block diagram schematically illustrating a configuration of a network system according to a third embodiment.

FIG. 8 is a block diagram schematically illustrating a configuration of a network system according to a third embodiment.

Referring to FIG. 8, a network system 10 according to the third embodiment includes a terminal 200 that includes a terminal controller 210 and a second communication module 220, and an air conditioner 100 that is connected to the terminal 200 so as to enable communication therebetween. Furthermore, the air conditioner 100 includes an outdoor unit 130 that is disposed outdoors and exchanges heat with outdoor air, and an indoor unit 140 that is disposed indoors and exchanges heat with indoor air.

The indoor unit 140 includes a first communication module 146 that is communication-connected to the second communication module 220, and an indoor unit controller 144 that controls the operation of the indoor unit 140.

The outdoor unit 130 includes a power sensing unit 132 that senses power information supplied from the power supply source 500, and an outdoor unit controller 134 that controls the operation of the outdoor unit 130. The power information may include power amount information or electricity cost information. Herein, the power sensing unit 132 may sense an amount of power that is used by the air conditioner 100. That is, the power sensing unit 132 may sense information of supplied power or information of used power.

The power sensing unit 132 may be understood as the power measurement unit 510 and power management unit 520 of FIG. 6. The power sensing unit 132 or the power measurement unit 510 and power management unit 520 may be called a power management apparatus that manages the power information transferred from the power supply source 500.

Information sensed by the power sensing unit 132 may be transferred to the terminal 200. Accordingly, a user may remotely monitor the power information of the air conditioner 100 from a place (for example, home) with the indoor unit installed therein and the outside of the installed place.

Figure 9:
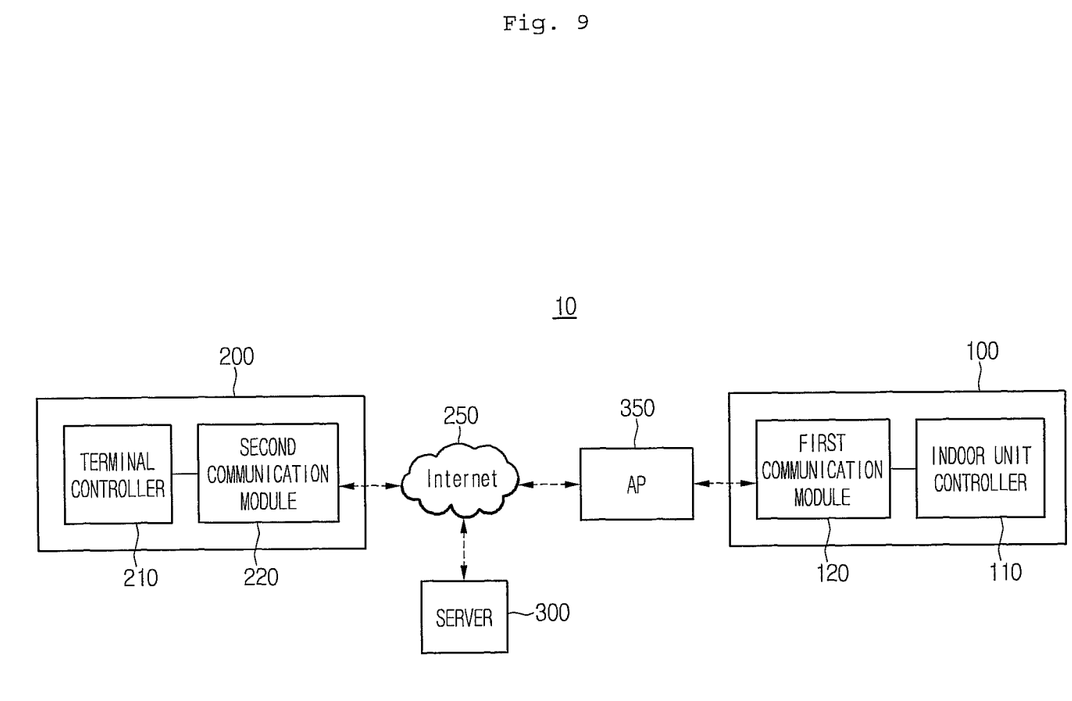
FIG. 9 is a block diagram schematically illustrating a configuration of a network system according to a fourth embodiment.

FIG. 9 is a block diagram schematically illustrating a configuration of a network system according to a fourth embodiment.

Referring to FIG. 9, a network system 10 according to the fourth embodiment includes an air conditioner 100 that includes a first communication module 120 and an indoor unit controller 110, and a terminal 200 that includes a second communication module 220 and a terminal controller 200.

The network system 10 further includes a server 300 that stores information regarding the air conditioner 100 and terminal 200, and a wireless access point (AP) 350 for setting a communication environment between the air conditioner 100 and terminal 200. The information may include the state information of the air conditioner 100 or terminal 200, and control information for operation of the air conditioner 100 or terminal 200. Furthermore, the terminal 200 may be registered (authenticated) in the access point 350 over Internet 250.

The access point 350 has a Dynamic Domain Name System (DDNS) function and a port forwarding function. The DDNS function denotes a function that designates a domain name to a floating Internet Protocol (IP) address and uses a floating IP as in a fixed IP.

A floating IP may be allocated to the first communication module 120. For example, the floating IP may be allocated through the access point 350. A floating IP of the first communication module 120 is registered in the access point 350, and a predetermined domain name corresponding to the floating IP may be designated to the first communication module 120.

When the predetermined domain name is inputted with the terminal 200, the DDNS searches an IP corresponding to the domain name and allows an input to be received. When the IP is changed, the first communication module 120 may access the access point 350 and allows the current state of the air conditioner 100 to be updated.

In this way, when the user inputs a specific domain name by using an Internet access function of the terminal 200, the access point 350 finds an IP corresponding to the domain name, and connects the terminal 200 and the air conditioner 100.

The port forwarding function denotes a function that connects a port number of a used application to an internal IP and port number when an external network user for the access point 350 desires to access an internal network. Herein, the internal network may be understood as a network between the access point 350 and air conditioner 100. The external network may be understood as a network over the access point 350, terminal 200, and Internet 250.

That is, when the user desires to access the air conditioner 100 with the terminal 200, a port of an application executed in the terminal 200 may be connected to the IP and port number of the air conditioner 100 by using the port forwarding function of the access point 350.

In this way, by performing the DDNS or port forwarding function of the access point 350, security access of a specific external user (terminal) can be achieved.

The server 300 may store or manage information that is shared between the terminal 200 and air conditioner 100, and receive a control command (message) inputted from the terminal 200 to transmit the control command to the air conditioner 100. Furthermore, the server 300 may web-monitor the communication connection state or controlled state between terminal 200 and air conditioner 100.

A method of connecting communication between a terminal and air conditioner, according to an embodiment, will be described below.

An application of the terminal 200 is executed for controlling the operation of the air conditioner 100. A specific domain name may be inputted to the terminal 200 over the Internet 250. The input domain name is transferred to the access point 350, and the access point 350 searches an IP address corresponding to the input domain name.

The IP address is relevant to the first communication module 120 of the air conditioner 100 that is controlled by the terminal 200, and the access point 350 determines the terminal 200 as an apparatus for controlling the air conditioner 100.

In this way, when communication connection establishment between the terminal 200 and air conditioner 100 is completed through the access point 350, the function or set value synchronization of the terminal 200 in FIG. 5 may be performed. When the synchronization is performed, the user may control the operation of the air conditioner 100 with the terminal 200. In such a control method, the operation of the air conditioner 100 can be easily control by the terminal 200.

On the basis of the power information received from the power supply source 500 and the operation information of the air conditioner 100, the operation of the air conditioner 100 can be controlled for reducing consumption power or electricity cost. The description of FIG. 7 is applied to this embodiment.

Figure 10:
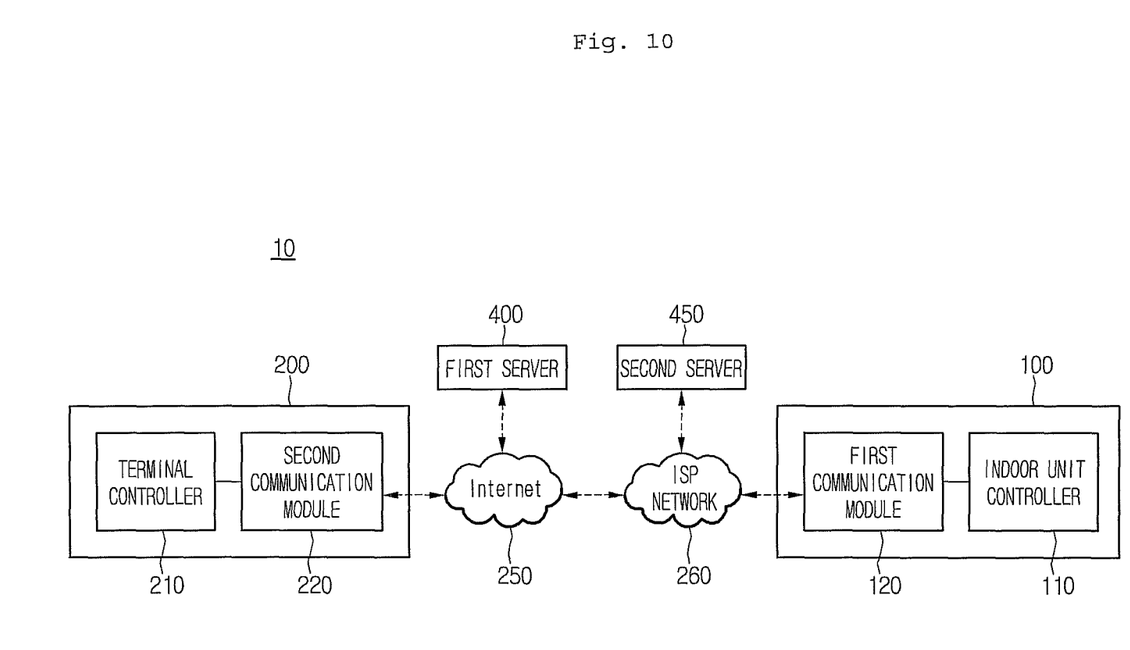
FIG. 10 is a block diagram schematically illustrating a configuration of a network system according to a fifth embodiment.
Figure 11:
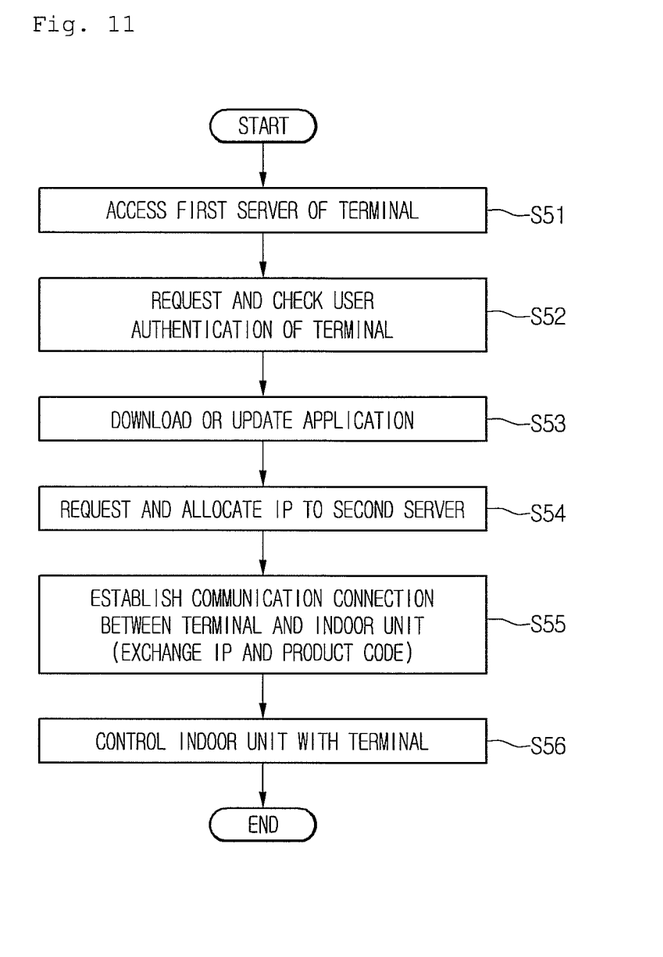
FIG. 11 is a flowchart illustrating a method of connecting communication between a terminal and air conditioner according to a fifth embodiment.

FIG. 10 is a block diagram schematically illustrating a configuration of a network system according to a fifth embodiment. FIG. 11 is a flowchart illustrating a method of connecting communication between a terminal and air conditioner according to a fifth embodiment.

Referring to FIGS. 10 and 11, a network system 10 according to the fifth embodiment includes an air conditioner 100 that includes a first communication module 120 and an indoor unit controller 110, and a terminal 200 that includes a second communication module 220 and a terminal controller 210.

The network system 10 further includes a first server 400 that stores control information of the air conditioner 100 and terminal 200, and a second server 450 for allocating an IP to the first communication module 120. The first server 400 may be a web server, and the second server 450 may be a Dynamic Host Configuration Protocol (DHCP) server.

The DHCP may be understood as a protocol that receives the allocation of an IP address from a server (which stores all IP addresses of one network) each time a computer (or communication module) is booted.

The terminal 200 may access the first server 400 over Internet 250, and the air conditioner 100 may access the second server 450 over an Internet Service Provider (ISP) network 260. Furthermore, the Internet 250 and ISP network 260 may be connected to each other so as to enable access therebetween.

The ISP network 260 may be understood as a network that is configured with a plurality of routers, for transferring a message packet for an IP address. For example, when intending to transmit certain information to an IP address (210.203.109.102) having four stages, the information is transferred to a lower router on the basis of the three ciphers (core router) of a first stage, and transferred to a next router on the basis of the three ciphers of a second stage. Through such series of operations, the information may be transferred to a device or communication module having the IP address (210.203.109.102).

When intending to transmit a communication connection requesting message of the terminal 200 to the first communication module 120 of the air conditioner 100, the terminal 200 may be connected to the ISP network 260 over the Internet 250, and the message may be transferred to the first communication module 120 through a plurality of routers.

A communication connection method according to an embodiment will be described below with reference to FIG. 11.

First, the terminal 200 accesses the first server 400. For example, the terminal 200 may access a web server (or web page) in operation S51.

The authentication request of the terminal 200 (i.e., an operation of requesting and checking the authentication of a terminal user) may be performed. For example, an IP address for the second communication module 220 and a product code of the terminal 200 may be inputted, and thus the authentication request may be performed. As another example, an ID and password of the user using the terminal 200 may be inputted, and thus the authentication request may be performed.

When an accurate IP and product code or the ID and password of the user are inputted, the first server 400 recognizes and checks the access of a pre-registered terminal or user. At this point, a message such as "the user has been normally accessed" may be outputted in operation S52.

An application for controlling the air conditioner 100 may be downloaded or updated by the terminal 200 in operation S200.

The air conditioner 100 or indoor unit may request an IP to the second server 450. In this case, the user may perform the IP request by inputting a certain command to the air conditioner 100.

The second server 45 may allocate a certain IP to the first communication module 120 in response to the IP request. Furthermore, an IP of the first communication module 120 may be registered in the first server 250 over the Internet 250. As a result, information (communication information and product information) on the terminal 200 and information (communication information and product information) on the air conditioner 100 may be stored in the first server 400 in operation S54.

Communication connection between the terminal 200 and air conditioner 100 (or indoor unit) may be established. The establishment of the communication connection may be made by exchanging the information on the terminal 200 and the information on the air conditioner 100. The information on the terminal 200 or air conditioner 100 may include each IP address and product code in operation S55.

In such a method, when communication connection is established between the terminal 200 and indoor unit, a synchronizing operation may be performed between the terminal 200 and air conditioner 100. The description of the first embodiment is applied to the synchronizing operation.

When the synchronizing operation between the terminal 200 and air conditioner 100 is performed, the operation of the air conditioner 100 or indoor unit may be controlled by the terminal 200 in operation S56.

According to such a control method, the operation of the air conditioner 100 can be easily control by the terminal 200. Also, on the basis of the power information received from the power supply source 500 and the operation information of the air conditioner 100, the operation of the air conditioner 100 can be controlled for reducing consumption power or electricity cost. The description of FIG. 7 is applied to this embodiment.

According to the embodiments, since the air conditioner and the terminal are connected so as to enable wireless communication, the terminal can remotely control the operation of the air conditioner.

Moreover, the terminal downloads specific information from the web server and controls the operation of the air conditioner on the basis of the downloaded information, thus enhancing accessibility to the air conditioner.

Moreover, since the downloaded information includes various functions for controlling the air conditioner, the terminal can easily set or change the function of the air conditioner.

Moreover, an in-home air conditioner is connected to a terminal or control apparatus outside home via the access point or a specific server, and information sharing (synchronization) is made between the air conditioner and the terminal or the control apparatus. Accordingly, the air conditioner can be easily controlled.

Moreover, information on the consumption power and electricity cost of the air conditioner can be checked on the basis of power information received from the outside, and thus, the use of the air conditioner or an amount of used power can be controlled.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

According to the embodiments, an air conditioner and a terminal are connected so as to enable wireless communication, and an operation of the air conditioner is remotely controlled or monitored by the terminal, thus noticeably enhancing availability of industry.

Embodiments provide a network system which controls an operation of an air conditioner with a terminal which downloads predetermined information from a web server.

Embodiments also provide a network system which receives and checks information on power, thus saving electricity cost.

In one embodiment, a network system includes: an air conditioner including a first communication module to enable communication; a terminal including a second communication module communication-connected to the first communication module, and downloading predetermined information from a web server; a power supply source supplying power to the air conditioner; and a power management apparatus managing power information supplied from the power supply source, wherein, on the basis of at least one of the power information and information on an operation of the air conditioner, the terminal displays power use information of the air conditioner.

In another embodiment, a network system includes: an air conditioner receiving power from a power supply source to condition air in a certain space; a terminal monitoring or controlling an operation of the air conditioner; at least one server storing information on an operation of the air conditioner or terminal; a communication interface enabling communication between the air conditioner and terminal; and a controller controlling the operation of the air conditioner to reduce consumption power or electricity cost, on the basis of power information received from the power supply source or the operation information of the air conditioner.

In further another embodiment, a control method of a network system, which controls an operation of an air conditioner with a terminal, includes: executing set information stored in the terminal; connecting communication between the terminal and air conditioner; receiving at least one of information on an operation of the air conditioner and power information supplied to the air conditioner; and determining whether to drive the air conditioner in a power saving mode.

The details of one or more embodiments are set forth in the accompanying drawings and the description below. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A network system comprising:
an air conditioner having a first communication module to enable communication;
a terminal having a second communication module to wirelessly communicate with the first communication module of the air conditioner, the terminal to wirelessly receive information from a server and the terminal to wirelessly perform a voice call or video call with another terminal;
a power supply to supply power to the air conditioner;
a power management apparatus to obtain power information from the power supply;
a server to store state information of the terminal or the air conditioner, or operation information of the terminal or the air conditioner; and
a wireless access point to allocate an Internet Protocol (IP) address, and the wireless access point to set a communication environment of the air conditioner,
wherein the terminal displays power use information of the air conditioner based on the power information from the power management apparatus or information related to operation of the air conditioner,
wherein the wireless access point determines an IP address of the air conditioner based on a domain name received from the terminal.

2. The network system according to claim 1, wherein the power information from the power management apparatus includes one of supplied power information, electricity cost information, produced power information or power quality information.

3. The network system according to claim 1, wherein the terminal provides a control signal to the air conditioner to control an operation time or function of the air conditioner.

4. The network system according to claim 1, wherein the power management apparatus comprises:
a power measurement unit to receive power supply amount information from the power supply; and
a power management unit to control an operation of the air conditioner based on power of the air conditioner.

5. The network system according to claim 1, wherein the power management apparatus is wirelessly connected to the second communication module of the terminal to provide a wireless communication between the power management apparatus and the terminal.

6. The network system according to claim 1, wherein a power sensing part is provided in an outdoor unit of the air conditioner to sense power information received from the power supply.

7. The network system according to claim 6, wherein the sensed power information includes information of supplied power or information of used power.

8. The network system according to claim 1, wherein the power use information of the air conditioner includes a used power amount of the air conditioner or a power cost of the air conditioner.

* * * * *